(12) United States Patent
Bachler et al.

(10) Patent No.: US 7,949,145 B2
(45) Date of Patent: May 24, 2011

(54) METHOD OF MANUFACTURING AN INDIVIDUALLY SHAPED HEARING DEVICE OR HEARING AID

(75) Inventors: Herbert Bachler, Meilen (CH); Christoph Widmer, Wernetshausen (CH); Alfred Stirnemann, Zollikon (CH)

(73) Assignee: Phonak AG, Stafa (CH)

( * ) Notice: Subject to any disclaimer, the term of this patent is extended or adjusted under 35 U.S.C. 154(b) by 1748 days.

(21) Appl. No.: 11/104,757

(22) Filed: Apr. 13, 2005

(65) Prior Publication Data
US 2006/0233384 A1    Oct. 19, 2006

(51) Int. Cl.
*H04R 25/00*    (2006.01)

(52) U.S. Cl. ............ 381/322; 381/60; 381/324; 381/328

(58) Field of Classification Search .............. 381/60, 381/328, 312, 324, 318, 322–323; 181/129, 181/135; 700/98, 118; 29/296.21, 896.21; 703/6
See application file for complete search history.

(56) References Cited

U.S. PATENT DOCUMENTS

| | | | |
|---|---|---|---|
| RE34,961 E * | 6/1995 | Widin et al. ................ | 703/6 |
| 5,487,012 A * | 1/1996 | Topholm et al. ............ | 700/163 |
| 6,533,062 B1 * | 3/2003 | Widmer et al. ............. | 181/129 |
| 6,540,045 B1 * | 4/2003 | Widmer et al. ............. | 181/135 |
| 6,920,414 B2 * | 7/2005 | Tøpholm ...................... | 703/1 |
| 7,349,549 B2 * | 3/2008 | Bachler et al. .............. | 381/314 |
| 2003/0021434 A1 * | 1/2003 | Hessel et al. ................ | 381/312 |
| 2003/0112988 A1 * | 6/2003 | Naylor ......................... | 381/314 |
| 2004/0107080 A1 * | 6/2004 | Deichmann et al. ........ | 703/6 |
| 2004/0264724 A1 | 12/2004 | Fang | |
| 2007/0147642 A1 * | 6/2007 | Kasanmascheff ........... | 381/322 |

FOREIGN PATENT DOCUMENTS

EP    1 345 470 A    9/2003
JP    1 414 271 A2    1/2004

OTHER PUBLICATIONS

Walsh, Timothy et. al., "Boundary element modeling of the external human auditory system", Mar. 2004, J. Acoust. Soc. Am., 115 (3), pp. 1033-1043.*
Pumford, John; Sinclair, Sheila; "Real-Ear Measurement: Basic Terminology and Procedure"; May 7, 2001; Audiology online; http://www.audiologyonline.com/articles/article_detail.asp?article_id=285.*
Chan, et al., "Estimation of Eardrum Acoustic Pressure and of Ear Canal Length From Remote Points in the Canal," J. Acoust. Soc. Am. 87, 1237-1247, 1990.
Cox, "Acoustic Aspects of Hearing Aid-Ear Canal Coupling Systems," Monographs in Contemporary Audiology, vol. 1, No. 3, Mar. 1979.
Hudde, et al., "Methods for Estimating the Sound Pressure at the Eardrum," J. Acoust. Soc. Am., vol. 106, No. 4, Pt. 1, Oct. 1999.

(Continued)

*Primary Examiner* — Curtis Kuntz
*Assistant Examiner* — Ryan Robinson
(74) *Attorney, Agent, or Firm* — Pearne & Gordon LLP

(57) ABSTRACT

The present invention provides a method of providing input parameters for the fitting process of individually shaped or customized hearing devices by storing geometry data during the manufacturing process into data storage and selectively reading out data from this data storage during the manufacturing and/or fitting process of the hearing device. To improve the quality and to reduce the time required for the fitting process, all the data available from the manufacturing process, e.g. the geometry data, may be used during the final fitting process at the dispenser's office.

6 Claims, 1 Drawing Sheet

OTHER PUBLICATIONS

Sanborn, "Predicting Hearing Aid Response in Real Ears," J. Acoust. Soc. Am. 103, 3407-3417, 1998.

Stinson, et al., "Specification of the Geometry of the Human Ear Canal for the Prediction of Sound-Pressure Level Distribution," J. Acoust. Soc. Am. 85, 2492-2503, 1989.

Kuhn, "Some Effects of Microphone Location, Signal Bandwidth, and Incident Wave Field on the Hearing Aid Input Signal," University Perk Press, Baltimore, 1980.

Killion, et al., "Corfig: Coupler Response for Flat Insertion Gain," University Perk Press, Baltimore, 1980.

\* cited by examiner

METHOD OF MANUFACTURING AN INDIVIDUALLY SHAPED HEARING DEVICE OR HEARING AID

TECHNICAL FIELD OF THE INVENTION

This invention relates to a method of providing input parameters for the fitting process of individually shaped or customized hearing devices.

BACKGROUND OF THE INVENTION

For a rapid manufacturing and final fitting of hearing devices, such as individually customized behind the ear or in-the-ear hearing aids, the process usually starts with taking an impression of the shape of the ear. The shape of this impression will than have to be digitized for instance by means of a scanning device. The first step must actually be performed with the user of the hearing device present at the location of the dispenser, whilst the following steps may be done either at the location of the dispenser or at the hearing device manufacturing center. With the digitized data of the outer shape of the hearing device, the shell of this hearing device may be typically manufactured by means of dedicated shell modeling software at the hearing device manufacturing center. This software produces a digital representation of the shell shape and the shell of the hearing device is then produced using a direct manufacturing process such as selective-laser sintering, stereo lithography or digital light processing. After assembling of the shell and the electronic and/or mechanical components of the hearing device, the hearing device is shipped to the dispenser for the final fitting according to the individual needs of the user of this device.

Although such a manufacturing process saves a reasonable amount of time for manufacturing individually shaped or customized hearing devices, the final process of fitting this device to the individual needs of the user is still time consuming and mostly based on empirically defined starting points or parameters and often leads to a lengthy series of trial and error steps until reaching the final result.

In absence of the exact geometric data, the input parameters for the fitting process dependent on the geometry of the shell and/or the ear will initially be set based on standard values or standardized estimates. During the fitting process, the parameters will then have to be adjusted by the mentioned trial and error principle to reach the desired result.

It is thus an object of the present invention to provide a method for estimating or defining more appropriate input parameters for starting the fitting process for a hearing device. It is a further object of the present invention to improve the manufacturing process of hearing devices by shortening the fitting process by providing individually adapted starting parameters of a good quality.

SUMMARY OF THE INVENTION

The present invention provides a method of providing input parameters for the fitting process of individually shaped or customized hearing devices by storing geometry data during the manufacturing process into data storage and selectively reading out data from this data storage during the manufacturing and/or fitting process of the hearing device.

To improve the quality and to reduce the time required for the fitting process, all the data available from the manufacturing process, e.g. the geometry data, should be used during the final fitting process at the dispenser's office. To have all such data available during the fitting process, the dispenser will advantageously have access to those data as they are stored in the data storage.

In one embodiment the data storage is a shared data storage, located at one or more locations, accessible via online connections from any other location. By providing a centralized data storage the storage capacity of this device may dynamically grow with the number of hearing devices and the amount of data to be stored. It is clear, that the centralized data storage may itself be a storage cluster with distributed shared storage devices, located at one location or at several different locations. As the data storage is accessible anytime from any location, all data generated in connection with the ordering and shell modeling may already be entered into the data storage and is thus instantly available for any following manufacturing process at any location.

In another embodiment, the connection will be established via the Internet. The accessibility of the data in the data storage via an Internet connection allows a quick and simple transfer of those data without the need of specialized connection means only for the purpose of manufacturing the hearing device. By using secure services and/or encryption the privacy of the data may be ensured.

In a further embodiment, the data storage is located directly in the hearing device memory. It is possible to store the geometry and parameter data directly in the memory of the hearing device. Thus the data is always directly available together with the hearing device itself and the hearing device therefore becomes a virtual extension of the data storage for all parameters and geometries generated during the manufacturing process. Instead of using the built-in memory of the hearing device, it is for instance as well possible to use memory of a remote control of the hearing device. As such data storage only has to storage the data of the particular hearing device, it is sufficient to provide only low storage capacity.

In a further embodiment, the method further comprises the step of storing the parameter data used during the manufacturing process. For the optimization of the following processes, it may be of advantage not only to store geometric data of the shape of the ear or ear canal and the hearing device, but also to store other parameter data of a certain importance in connection with the fitting process of the hearing device.

In a further embodiment, the available geometry and/or parameter data of the order and/or ear impression and/or shell modeling process will be stored as well into the data storage. The fitting software can thus simply read-out the required information from the data storage during the fitting process and use this information for pre-calculation and simulation of the acoustic behavior of the hearing device.

In a further embodiment, at least one of the following geometry data is stored:
cross section area, shape of cross section and length of vent geometry,
vent microphone distances, microphone positions, depth of hearing device in concha, height of concha, width of concha;
length of hearing device, averaged ear canal cross section.

With such data available to the dispenser performing the fitting process, it is possible to obtain a simplified model to achieve a good approximation of the acoustic properties of the customized hearing device and to start the fitting process with nearly optimal parameters which only need minor modification during the final fitting process.

In a further embodiment at least one of the following quantities will be estimated by reading out the appropriate data from the data storage:

vent loss, reduction of occlusion effect, real ear occluded gain, real ear to coupler difference for low frequency range;

microphone location effect, beamforming correction for higher frequencies, feedback threshold estimation;

estimation of residual volume and distance to ear drum;

real ear to coupler difference for high frequency range;

open ear gain.

By using the data stored in the data storage as input parameters, it is possible to estimate the above mentioned quantities for entering into the final fitting process.

It is pointed out that the present invention not only applies to hearing devices such as behind the ear or in the ear canal hearing aids for the compensation or correction of a hearing impairment. The present invention may be applied as well for any hearing device used to improve communication.

BRIEF DESCRIPTION OF THE DRAWINGS

For the purpose of facilitating and understanding of the invention, there is illustrated in the accompanying drawing a preferred embodiment thereof to be considered in connection with the following description. Thus the invention may be readily understood and appreciated by the only FIGURE showing schematically a process view of one embodiment of the inventive method.

DESCRIPTION OF EMBODIMENTS OF THE INVENTION

Figure 1:
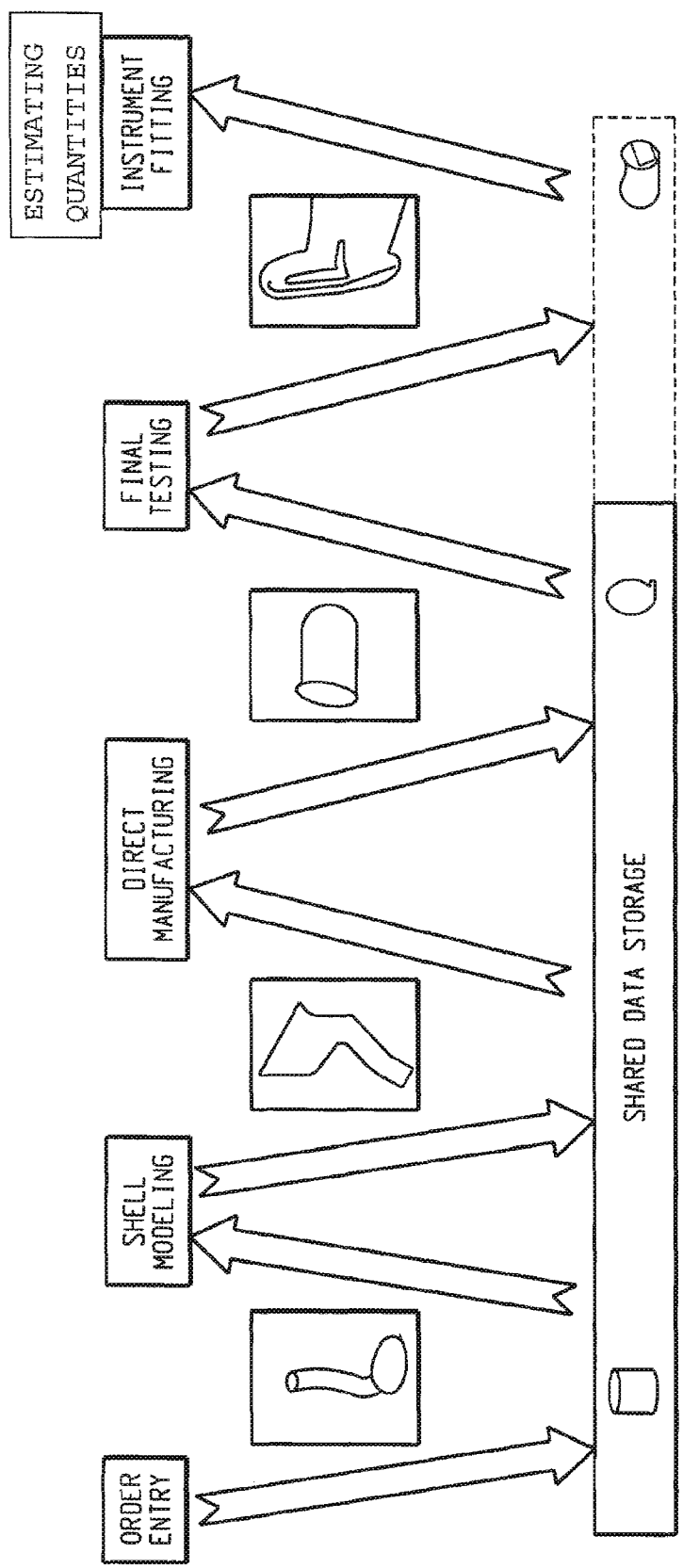

Referring to the only FIGURE, the process of manufacturing an individually shaped or customized hearing device in form of a miniaturized in-the-ear hearing aid starts at the moment of ordering such a device and ends with the final fitting process. In the upper part of the FIGURE, the individual stages of ordering and manufacturing are shown while in the middle part the actual shape or stage of the hearing device shell is exemplary shown in small pictures.

The data storage is schematically shown as a bar in the lower part of the FIGURE in order to manifest its accessibility during the whole process at each process step. The accessibility is independent of the location of the ordering and manufacturing process. At each process step, new data such as geometry data will be stored into the data storage and eventually read out of the data storage for input into one or more of the following process steps.

In one embodiment of the invention, this data storage is a centralized shared data storage, located i.e. at the hearing device manufacturing location. This data storage is advantageously online accessible from all different locations where the manufacturing process takes place. This access may for instance be provided via direct Internet access to this data storage. One of the great advantages of such a data storage is in fact its practically unlimited storage capacity. As the centralized data storage does not have to be moved together with the hearing devices, it is not limited by weight or shape and may be designed to dynamically grow with the needs of storage capacity. It is thus possible to store the complete digitized shape geometry of the whole ear and not only of the hearing device shell for each individual user, for an exact simulation of the acoustic properties and behavior of such a hearing device.

In another embodiment of the invention, this data storage is located directly in the storage area of the hearing device itself, e.g. in the memory of the hearing aid electronic components to be assembled into the hearing device itself or in the memory of a remote control for the hearing device. Such memory will then be transferred together with the model of the shell or later with the shell itself for the whole manufacturing process and the data will be transferred by means of direct link or remote link into the memory. For an economical use of the limited storage capacity of such memory, the data may be erased after the final fitting process and the free space used for other data or parameters used for the operation of the hearing device.

For the final fitting process, all of those stored data may preliminary be used for a complete simulation of the acoustical performance of the hearing device under operational conditions, i.e. when inserted into the user's ear canal and thus an intelligent pre-calculation of optimal hearing device settings may be performed prior to the final fitting process. For instance, vent shape such as cross section, length and curvature, vent microphone distances, shell thickness, estimated residual volume between the hearing device and the tympanic membrane are such geometry information that can be used for the fitting process. Also other parameters determined during the manufacturing process and stored in the data storage may used if of relevant influence with respect to the optimal acoustic performance of the hearing device.

A method for recording of information in a hearing aid is published in EP 1 414 271. This method may be used for the technical process of storing the information described above either in the hearing aid memory or in a centralized or shared storage.

Thus, the present invention provides a method to improve the quality of the fitting in a time saving manner, as both known and/or estimated geometry data collected through the whole process of manufacturing of a hearing device are used preliminary and/or during the fitting of the hearing device at the dispenser's office. The usage of the entire shape data of the ear impression and the shell of the hearing device allows a complete simulation of acoustical performance of the hearing aid under operational conditions, i.e. when inserted into the user's ear canal, by considering aspects such as the shape of the concha bowl or reflection of sound waves from the vent at the tragus or the dampening effect of the shell structure. As it is currently not possible to store such data completely within the memory of the hearing device, the use of a centralized or shared data storage device is of great advantage.

The invention claimed is:

1. Method of providing input parameters for a fitting process of an individually shaped or customized hearing device, comprising the steps of:

storing geometry data during a manufacturing process of the hearing device into a data storage;

storing parameter data used during the manufacturing process of the hearing device into the data storage; and selectively reading out the geometry and/or parameter data from the data storage during the fitting process of the hearing device for estimating at least one of the following quantities:

vent loss, reduction of an occlusion effect, real ear occluded gain, and real ear to coupler difference for a low frequency range;

microphone location effect, beam-forming correction for higher frequencies, and feedback threshold estimation;

estimation of a residual volume, and distance to an ear drum;

real ear to coupler difference for a high frequency range; and open ear gain.

2. The method of claim 1, wherein the data storage is a shared data storage, located at one or more locations, and accessible via online connections from any other location.

3. The method of claim 2, wherein the connection is established via the Internet.

4. The method of claim 1, wherein the data storage is located directly in the hearing device memory.

5. The method of claim 1, wherein at least one of the storing steps comprises storing available geometry and/or parameter data of an order and/or ear impression and/or shell modeling process into the data storage.

6. The method of claim 1, wherein the geometry data is selected from the group consisting of:
- cross sectional area of the hearing device, shape of a cross section, and length of a vent geometry;
- vent microphone distances, microphone positions, depth of the hearing device in a concha, height of the concha, and width of the concha; and
- length of the hearing device, and an averaged ear canal cross section.

* * * * *